United States Patent Office 2,972,431
Patented Feb. 21, 1961

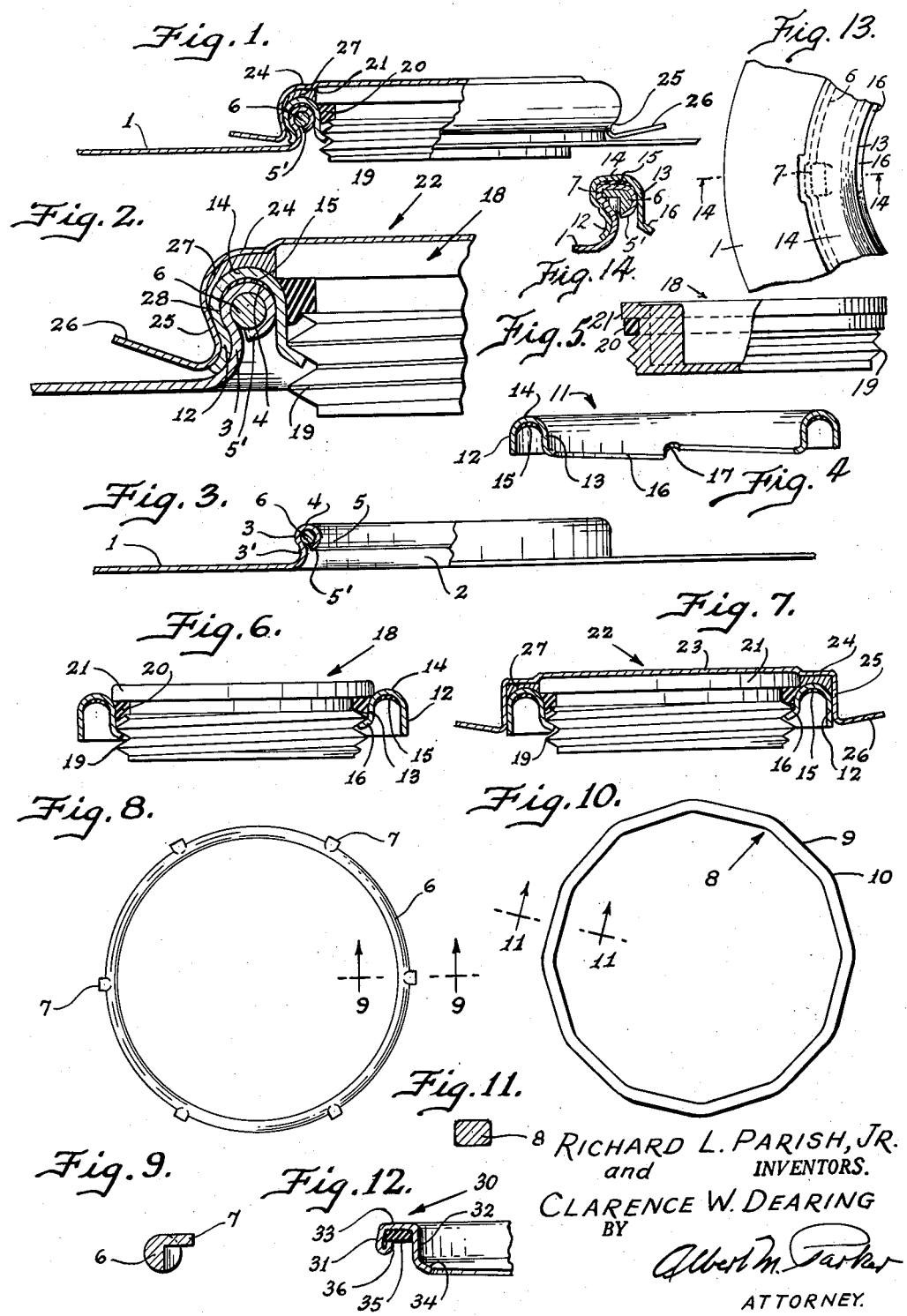

2,972,431

CONTAINER CLOSURES AND METHODS

Richard L. Parish, Jr., North Salem, N.Y., and Clarence W. Dearing, Chicago, Ill., assignors to American Flange & Manufacturing Co., Inc., New York, N.Y., a corporation of Delaware Filed Dec. 13, 1954, Ser. No. 474,776

5 Claims. (Cl. 220—39)

This invention relates to closures for containers and methods of applying the same and is particularly concerned with the provision of closures for large containers, which closures can be applied after the containers have otherwise been completed and filled.

Heretofore closures for large containers, such as cans, pails, drums and barrels, generally required that some opening bordering fitting, formed to receive a screw threaded closing member, be joined to a wall of the container during the manufacture of the same. Most commonly this has been done by the application to the container wall, about the opening therein, of fittings in the form of screw threaded bushings, or sputs. These fittings have normally been applied by pressing or welding them in place prior to the assembly of such wall with the rest of the container. Effective closures were formed in this manner but they involved work by the container manufacturer, in the application of the fitting about the opening and in the screwing in place of the closure member needed for filling that opening. Then when finished containers, so formed, arrive at the filling plant, the closing members have to be unscrewed for filling and replaced after the filling is completed.

In some instances integral formations have been provided about the openings themselves, for the reception of a threaded or cam-type closing member, but these have not met with any particular success. Furthermore they still require that the closing member be applied and removed several times before the filled container is sent on its way.

With the increase in the use of containers within the size and type ranges here being considered and with the speed-up in the filling of such containers, a demand has arisen for closures which have all the closing and sealing effectiveness of those heretofore employed but which can be more readily and more simply applied.

The article and method of the instant invention not only meet this new demand but they do so while providing a readily applicable closure which has all the effectiveness of the best closures heretofore employed. All the container manufacturer has to do is to form an opening in the container wall as he forms such wall and work the material around such opening into a particular formation. In shipping empty containers to his filler customers the container manufacturer merely hand applies a suitable cap, or seal, over the formations at the openings, which cap or seal may be a cheap metal or plastic member. These caps are as simply removed when the container reaches the filling line, leaving a larger opening than has heretofore been the case for effecting filling. Once the filling is completed, a complete closure, including a fitting in the form of a flange or bushing, a closure plug, and a capseal, pre-assembled by the closure manufacturer, is quickly hand-seated in place in and about the opening. Such complete closure is then effectively secured in place by a simple crimping action, the same as heretofore followed in the application of capseals over already closed container wall openings.

When the customer receives the container so closed, he removes the capseal by destroying it and unscrews the closure plug to gain access to the contents. He has an effective closure plug to replace for retaining such of the contents as may remain.

It is accordingly an object of this invention to simplify the fabrication of a wide range of styles and sizes of containers.

Another object is to eliminate a substantial part of the work heretofore imposed on the container manufacturer in the provision of openings and closures therefor for the containers manufactured by him.

Another object is to transfer the application of closures for container wall openings to the filler of the container.

Still another object is to provide assembled container closures which may be quickly, simply and effectively applied by the fillers of containers.

A further object is to provide such closure combinations which furnish the full closing and sealing effectiveness heretofore considered essential in this art.

A more detailed object is to provide container wall openings to which completely assembled closures may be hand applied and simply secured.

Other objects are to provide improved methods for forming container wall openings and for the closing and sealing of the same.

Further and more detailed objects will in part be obvious and in part be pointed out as the description of the invention, taken in conjunction with the accompanying drawing, proceeds.

In that drawing:

Fig. 1 is a part elevation, part sectional view of a container wall closure assembly in accordance with the invention.

Fig. 2 is an enlargement of the portion of Fig. 1 shown in section.

Fig. 3 is an elevation, partly in section, of a portion of the container wall provided with an opening formation to receive the closure of the invention.

Fig. 4 is a vertical section of the fitting member of the combination, formed for application to the opening formation of Fig. 3.

Fig. 5 is an elevation, partly in section, of a closure plug for forming part of the combination.

Fig. 6 is a view of the fitting as in Fig. 4, with a closure plug assembly therewith.

Fig. 7 is a similar view of the complete assembly of fitting, closure plug and capseal.

Fig. 8 is a top plan view of the reinforcing and rotation resistant ring of the invention.

Fig. 9 is a vertical section thereof taken on lines 9—9 of Fig. 8 and looking in the direction of the arrows.

Fig. 10 is a top plan view of a modified form of a reinforcing and rotation resistant ring.

Fig. 11 is a section on line 12—12 of Fig. 11 and looking in the direction of the arrows.

Fig. 12 is a vertical section of a modification of the ring member of Fig. 4.

Fig. 13 is a fragmentary top plan view of the assembly of neck, ring and plug receiving ring member illustrating the manner in which rotation of the ring member is prevented; and Fig. 14 is a section taken on lines 14—14 of Fig. 13 and looking in the direction of the arrows.

The container wall formation and closure combination of the invention will be described from the standpoint of its applicability to a container, such as a steel barrel or drum, but it is, of course, to be understood that this is for illustrative and not limiting purposes, inasmuch as the opening formation, closure combination and method of the invention are equally applicable to containers of a wide range of sizes and types. Thus the container wall 1 may be either the head or side wall of a container, of any size, to which the closure of the invention can be effectively applied.

The container wall 1 is suitably formed with an opening therethrough, which opening, as it is formed, is bordered by an upwardly extending neck 3 which is returned at 4, into a collar portion 5, spaced from the upstanding portion 3. As initially formed the neck 3 extends substantially straight up and the portion 5 extends substantially parallel thereto. For certain containers this is all the container manufacturer needs to do in providing openings to be subsequently closed by closing elements applied by the filler. Preferably, however, the receiving formation, 3, 4, 5, around the opening, is reinforced while, at the same time, provision is made for preventing the closure portion, to be applied by the filler, from rotating with respect to the receiving formation. Such reinforcement and rotation prevention is effected by the inclusion of an element 6 within the pocket between the neck portion 3 and the collar portion 5 to lie up against the underside of the portion 4. The element 6 may be in the form of a closed ring or may be a ring like member with aligned but unattached ends.

For purposes of illustration the ring per se, shown in Fig. 8, is of the closed type. From that showing and from the cross-section thereof in Fig. 9, it is seen that the ring is provided with rotation prevention projections 7 thereon. The projections as here illustrated, are formed by punching the ring at spaced intervals and thus swaging the projections 7 out from the same. These extend outwardly sufficiently to furnish the desired prevention of rotation as will hereinafter be pointed out.

An alternate form of ring is generally indicated at 8 in Fig. 11. This ring is a little off the circular, being formed as a multi-sided polygon, providing flat sections 9 on its exterior surface joined by convex corners 10. This ring, a cross-section of which is seen in Fig. 12, may be formed by stamping it out of available material which may be scrap. This ring also serves effectively as a reinforcement as well as a rotation resistant element.

If the container manufacturer is to apply one of the rings, such as 6 or 8, the same is seated in the channel between the neck 3 and the collar 5, after they are formed or may be included during the forming of them. Though these rings, due to their irregular contour, bite into the metal of the neck 3 as they are seated in the channel, this action is hardly sufficient to keep at least a substantial portion of the rings from dropping into the container. Furthermore, unless the rings are held up into the channel beneath, they tend to turn as the portion 3 is crimped in beneath them, whether that be done by the drum manufacturer or by the filler in applying the closure over this seat. This turning action causes the projecting portions, such as 7 in Fig. 9, to swing downward and thus materially reduces the torque resistance between the after applied closure and the neck. Thus it is preferable to turn the bottom of the collar 5 inwardly, as shown at 5′, against the underside of the ring 6 and across to a terminating position close to the inner surface of the neck 3. This step is also desirable when a ring, such as shown at 8 in Fig. 10, is employed.

Also where the containers are of any size and their stock is of appreciable thickness, the force which an operator can exert, by means of a hand crimping tool, would be insufficient to flare the neck 3 inwardly below the ring 6 as well as flaring the closure collar and capseal inwardly as well. Thus as the drum manufacturer compresses the curl of the collar 5 beneath the ring 6, he would preferably flare the neck 3 inwardly as shown at 3′. This, of course, would not be necessary in the case of small containers made out of light weight stock.

For closing the container so formed, for transporting it to the filler, the container manufacturer merely closes any openings, such as 2, by a suitable hand applied cap which may be fitted over the neck 3 or by a similarly effective hand applied plug member which may be pushed into the opening bordered by the collar 5. When the filler is ready to fill such containers it is a simple matter to remove these temporary closures and throw them away or collect them for return to the container manufacturer for re-use.

With the one or more openings in the container uncovered for filling, the container is then moved along the filling line. As it is filled and leaves the filling station a combination closure, as illustrated in Fig. 7, is initially applied to the opening by merely hand seating it in place like the initial seating of a wooden bung in the bung hole of a beer barrel. Then the closure is crimped in place as will be described in more detail hereinafter. Suitable automatic feeding and seating means may be employed if the volume warrants it.

The closure combination consists of a ring member, shown per se in Fig. 4, and generally indicated at 11. This ring has a U-shaped peripheral portion formed with spaced annular walls 12 and 13 joined by a curved base wall 14. The relationship of these formations is such that, as initially applied, they embrace the neck 3 of the portion 4 and the collar 5 in a fit which is devoid of any substantial play. A gasket 15, shown in this form as being of the flowed-in type, is carried in the base of the channel formed by the walls 12, 13, 14 and, as best seen in Fig. 2, this gasket seats on the outer surface of the portion 4 around the opening in the container wall.

The ring member 11, besides facilitating a quick closing of the container, provides for the threaded reception of a closure plug for subsequent opening and reclosing of the container. As here shown this is effected by the provision of an inwardly extending ledge 16 at the bottom of the wall member 13, which ledge borders the opening through the ring and is helically formed to provide a single thread whose ends are spaced apart at the notch 17. The pitch of this helix is such as to take a screw threaded closure plug, as illustrated at 18 in Fig. 5, having a screw threaded side wall 19 suitably formed to receive the helix of the ledge 16. Furthermore the plug, as here illustrated, carries a gasket 20 above its threads, which gasket lies beneath the plug head 21. The formation of the plug head and the location of the plug gasket, as seen from Figs. 1, 2 and 7, is such that the gasket seats down against the surface 13, just below the radius of the top wall 14, while the head 21 comes into engagement with the inturned surface of the top wall 14 by the time the gasket is suitably compressed.

The particular plug shown here is of a type well known in the art and the showing of it here is for illustrative and not limiting purposes. Actually the formation of the ledge 16 is such as to render it capable of receiving a variety of plugs, whether formed with screw threads or merely with follower elements receivable within the notch 17 and capable of drawing the plug down tightly as it is turned while the formation rides beneath the ledge 16.

As an alternative the ledge 16 can be formed as an uninterrupted circle set at an incline corresponding to the incline of the thread on the plug to be received therein. To facilitate engagement of the plug therewith the thread on the plug should preferably be tapered or have a pitch diameter somewhat less than that of the opening.

Another alternative to the ledge 16 is to replace the same by a downwardly extending wall having actual threads either roller swaged or otherwise formed therein.

The closure assembly just described provides a leakproof closing merely by the application of the plug 18 to the ring member as illustrated in Fig. 6 and the application of such combination to the container wall opening as seen in Figs. 1 and 2. It is generally preferable, however, to incorporate a leakproof and tamperproof capseal over such container closures. Here such a capseal would normaly be assembled over the ring member and plug, prior to the application of the ring member to the receiving formation around the opening. This forms a complete closure combination for application to the container wall opening as illustrated in Fig. 7.

From that showing it is seen that the capseal, generally indicated at 22, has a top portion 23 which overlies the head 21 of the plug. This top portion is recessed downwardly at 24, around the head of the plug, while a skirt 25 extends laterally downward from the portion 24. Normally when the capseal is pressed in place over the plug and ring member its skirt 25 engages the exterior of the surface 12 with sufficient friction to cause the capseal to stay in place, over the plug and ring member, during shipment of the combination from the closure manufacturer to the filler. If, however, the capseal is made of light material, of little holding power, a slight inward deflection of its skirt and of the wall member 12 may be effected by the closure manufacturer to assure proper holding.

The skirt 25 of the capseal, as here illustrated, preferably includes tearing tabs 26 extending laterally from the free edge of that skirt. When the capseal is to be removed these tabs may be grasped to tear a strip up the skirt 25 and continue the same across the top 23 until the capseal is sufficiently destroyed to fall off or easily be pried off.

It is also to be noted that the capseal 22 carries a gasket 27 lying beneath the depressed peripheral portion 24 thereof and within the skirt 25. This gasket is preferably formed by flowing gasket material, in fluid form, into the capseal and letting it set. The gasket 27 has sufficient body, as seen in Fig. 7, to fill the space bordered by the peripheral edge of the plug head 21, the inside of the skirt 25 of the cap, the undersurface of the capseal portion 24 and the upper surface of the portion 14 of the ring member. This gasket accordingly serves to form a most effective seal when the capseal is subsequently crimped as illustrated in Figs. 1 and 2.

Assuming then that the closure combination, as shown and described in Fig. 7, has been initially applied to the opening bordered by the surface 5 by merely pushing the ring member in place over the receiving formation, the final securing of this closure combination in place is effected in simple manner by the use of a crimping tool comparable to those heretofore employed in this art for the application of capseals. As an illustration of such a crimping tool, reference is made to United States Patent No. 2,034,776, in the name of John W. Shera, dated March 24, 1936.

Such tool is seated in place with its jaws suitably engaging the skirt of the capseal, or the outer surface of the wall 12 if no capseal is being used, and is then actuated so that such jaws crimp the skirt 25 and the wall 12 inward to lie against the wall 3 and mate with its recessed portion 3'. The resultant assembly is as illustrated in Fig. 2. This action secures the ring member 11 in place and locks the same against rotation which might otherwise occur by the turning of the plug 18. Such locking action is caused by the projections 7 forcing the opposed portions of the metal of the neck 3 outwardly. These portions in turn seat into the metal of the wall portion 12 at the position 28 as seen in Fig. 2.

At the same time the gasket 15 is compressed tightly against the upper surface of the portion 4 and the gasket 27 is compressed within the space beneath the depression 24.

When it is subsequently desired to gain access, in authorized manner, to the contents of the container, the capseal 22 may be removed by grasping its tab 26 and tearing along the score lines bordering that tab as already pointed out. The plug 18 may then be unscrewed. All this is effected, however, without disturbing the tight joint between the receiving formation around the container wall opening and the ring member 11. Consequently the plug may be replaced to protect the contents of the container. Once the container is emptied it may be re-filled and re-used by removing and replacing the plug. It may then be sealed by applying another capseal thereover.

An alternate to the ring member 11 is shown at 30 in Fig. 12. Here the outer wall 31 and the inner wall 32 are joined by a base portion 33, here shown as flat though it can be of other configuration if desired. The wall 32 carries an inwardly extending ledge 34 comparable to the ledge 16 of Fig. 4. A preformed gasket 35 is seated in the base of the channel between the walls 31 and 32 and is held up in that channel by having the bottom of the wall 31 turn inwardly and upwardly at 36. The portion 36 not only holds the gasket in place but, if the ring member is made of light weight material, it serves to strengthen the portion 31.

Though a particular form of capseal has been shown in the accompanying drawing and described herein, it is, of course, to be understood that such is for illustrative and not for limiting purposes and that various forms of capseals, suitably sized and shaped to fit the particular ring member and the particular plug, may be employed without departing from the spirit and scope of the invention. It is further to be understood that the particular formation around the container wall opening, the particular re-inforcing and rotation resistant rings and the particular formation of ring member, as well as the overall assembly, as here illustrated, show the presently preferred embodiments of the invention but are submitted as illustrative of the invention and not in a limiting sense.

Having described our invention what we claim is new and desire to secure by Letters Patent is:

1. A closure assembly for securement in assembled form to an opening in a wall of an already formed container from the outside thereof which includes a seating ring formed out of light weight sheet metal and consisting of an upwardly extending outer portion, a returned upper portion and a downwardly extending inner portion forming a channel therebetween for engagement with a receiving seat on a container wall, said downwardly extending portion terminating in an inwardly extending thread element for engagement with the threads of a closure plug, a closure plug screwed in place in said seating ring, an annular gasket carried on the exterior of said closure plug and engaged with said downwardly extending inner portion of said seating ring, to provide a leakproof joint between said plug and said ring.

2. In a closure assembly as in claim 1, a capseal, having a top portion and a skirt portion, said top portion overlying said closure plug and said returned upper portion of said seating ring, said skirt portion overlying said upwardly extending outer portion of said seating ring and being engaged therewith, a gasket seated around and within the periphery of said capseal, said gasket being compressed against the upper surface of said returned portion of said seating ring.

3. The method of forming and closing openings in containers which comprises perforating a wall of said container, forming a receiving seat out of the material of said container wall around said perforation, forming a closure plug receiving ring for mating engagement with said seat and with a threaded element receiving portion thereon, securing a threaded closure plug in threaded engagement with said threaded element engaging seat, applying a capseal over said plug and said ring seat, thereafter applying said ring to said receiving seat in mated engagement, and, securing said ring and seat together and said capseal in tamperproof and leakproof engagement thereover by simultaneously crimping the skirt of said capseal and the opposed outer portions of said ring and said seat inwardly around their peripheries.

4. In closure construction for containers, a sheet metal container wall formed with a restricted opening therethrough, a neck integrally formed out of said container wall material surrounding said opening and extending upwardly from said wall, the upper end of said neck being turned away from the normal contour of said neck in the form of a rounded bead, said bead, in cross-section, forming a substantially closed loop terminating in a free end face closely adjacent the extension of said neck below said bead, a reinforcing member received within and tightly held by said bead, said reinforcing member being formed with outwardly extending projections and said bead portion, where the same overlies said projections, being extended outwardly in mated relationship with said projections, a receiving seat member for a closure formed out of sheet metal substantially the same as that of said container wall, said receiving seat member being formed in an inverted U shape in cross-section and being dimensioned to seat down over said bead, said receiving seat member being seated on said bead with the outer leg of said U being formed inwardly with the upper portion thereof having parts extended outwardly in mated relationship with said projections and the lower portion of said outer leg and the portion of said neck, below said bead, being formed inwardly in mated relationship, and the lower end of the inner leg of said U being formed into a single thread for the reception of a closure member.

5. In closure construction for containers, a container wall formed of sheet metal and with a restricted opening therein, a receiving seat for a closure formed out of the material of said container wall surrounding said opening, said receiving seat including an integral neck extending up from said container wall surrounding said opening, said neck having the upper portion thereof turned inwardly and downwardly into the form of a rounded bead and reversed upon itself to terminate in an outwardly extending portion, a reinforcing member received within said bead and extending throughout said bead, said reinforcing member being formed with projections extending outwardly from the periphery thereof at spaced positions around said periphery, said outwardly extending portion of said bead being tightly engaged beneath said reinforcing member and terminating closely adjacent the inner surface of said neck beneath said reinforcing member, and the material of said bead, where the same overlies said projections, being formed outwardly into mated rotation preventing projection portions for non-rotative engagement with a ring member to be secured thereover.

References Cited in the file of this patent

UNITED STATES PATENTS

| | | |
|---|---|---|
| 30,806 | Evans | Dec. 4, 1860 |
| 1,398,686 | Graf | Nov. 29, 1921 |
| 1,473,411 | Wacker | Nov. 6, 1923 |
| 1,474,645 | Schilling | Nov. 20, 1923 |
| 1,623,067 | Oakley | Apr. 5, 1927 |
| 1,679,273 | Schwartz | July 31, 1928 |
| 1,915,300 | Draper | June 27, 1933 |
| 1,930,102 | Liner | Oct. 10, 1933 |
| 1,974,968 | Meek | Sept. 25, 1934 |
| 2,008,245 | Curtis et al. | July 16, 1935 |
| 2,025,850 | Dillhoefer | Dec. 31, 1935 |
| 2,063,538 | Dahl | Dec. 8, 1936 |
| 2,241,793 | Steven | May 13, 1941 |
| 2,328,696 | Voglesong | Sept. 7, 1943 |
| 2,382,378 | Bloedorn | Aug. 14, 1945 |
| 2,445,802 | Robinson | July 27, 1948 |
| 2,447,535 | Robinson | Aug. 24, 1948 |
| 2,460,720 | Thompson | Feb. 1, 1949 |
| 2,471,716 | Bell | May 31, 1949 |
| 2,484,271 | Coyle | Oct. 11, 1949 |
| 2,644,215 | Van Buren | July 7, 1953 |

FOREIGN PATENTS

| | | |
|---|---|---|
| 449,035 | Great Britain | June 19, 1936 |